United States Patent
Moffett et al.

(10) Patent No.: US 9,067,247 B2
(45) Date of Patent: *Jun. 30, 2015

(54) TREATMENT OF TAILINGS WITH DEIONIZED SILICATE SOLUTIONS

(71) Applicant: E I du Pont de Nemours and Company, Wilmington, DE (US)

(72) Inventors: Robert Harvey Moffett, Landenberg, PA (US); Sigridur Soley Kristjansdottir, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/848,244

(22) Filed: Mar. 21, 2013

(65) Prior Publication Data

US 2014/0007795 A1    Jan. 9, 2014

Related U.S. Application Data

(60) Provisional application No. 61/668,595, filed on Jul. 6, 2012.

(51) Int. Cl.

| | |
|---|---|
| C09D 1/02 | (2006.01) |
| C09J 1/02 | (2006.01) |
| C04B 7/00 | (2006.01) |
| C04B 14/00 | (2006.01) |
| C04B 24/00 | (2006.01) |
| C04B 24/10 | (2006.01) |
| B09B 3/00 | (2006.01) |
| C02F 1/52 | (2006.01) |
| C10G 1/04 | (2006.01) |
| C02F 11/12 | (2006.01) |
| C02F 103/10 | (2006.01) |
| C02F 103/36 | (2006.01) |

(52) U.S. Cl.
CPC ............. *B09B 3/0025* (2013.01); *B09B 3/0041* (2013.01); *C02F 1/5236* (2013.01); *C02F 11/12* (2013.01); *C02F 2001/5218* (2013.01); *C02F 2103/10* (2013.01); *C02F 2103/365* (2013.01); *C10G 1/045* (2013.01); *C10G 2300/1033* (2013.01); *C10G 2300/208* (2013.01)

(58) Field of Classification Search
USPC ................................ 106/607, 600, 632, 633
See application file for complete search history.

(56) References Cited

U.S. PATENT DOCUMENTS

| | | | |
|---|---|---|---|
| 2,244,325 A | 6/1941 | Bird | |
| 3,668,088 A | 6/1972 | Iler | |
| 5,470,435 A | 11/1995 | Rushmere et al. | |
| 5,482,693 A | 1/1996 | Rushmere et al. | |
| 5,543,014 A * | 8/1996 | Rushmere et al. | ......... 162/181.6 |
| 5,626,721 A * | 5/1997 | Rushmere et al. | ......... 162/181.6 |
| 2010/0104744 A1* | 4/2010 | Moffett | ......... 427/138 |

FOREIGN PATENT DOCUMENTS

| | | |
|---|---|---|
| EP | 1371608 A1 | 12/2003 |
| JP | 199500803 A | 1/1995 |
| JP | 2002079527 A | 3/2002 |
| JP | 2002220220 A | 8/2002 |
| JP | 2003311130 A | 11/2003 |
| JP | 2004323326 A | 11/2004 |
| WO | 02051748 A1 | 7/2002 |
| WO | 2012088262 A1 | 6/2012 |

OTHER PUBLICATIONS

Kotylar, Cay and Clay Materials, vol. 44, No. 1, pp. 121-131, 1996 (referenced not included).
Iler, The Chemistry of Silica, Wiley Interscience, 1979, p. 116.
U.S. Appl. No. 13/329,375, filed Dec. 19, 2011.
International Search Report, PCT/US2013/035232, Mailed date Oct. 2, 2013.

* cited by examiner

*Primary Examiner* — James McDonough

(57) ABSTRACT

A process for treating a tailings stream comprises (a) contacting a deionized silicate solution with a tailings stream whereby the solids are entrapped within a gel produced from the silicate solution; and (b) allowing the gel to strengthen and solidify. The process may further comprise spreading the gel produced in step (a) over a surface. The present invention is particularly useful to treat tailings streams produced in processes to extract bitumen from oil sands ores.

20 Claims, No Drawings

TREATMENT OF TAILINGS WITH DEIONIZED SILICATE SOLUTIONS

FIELD OF THE INVENTION

The present invention relates to a process to treat tailings streams produced in mining operations to provide a trafficable surface.

BACKGROUND OF THE INVENTION

Tailings, as a general term, refers to byproducts from mining operations and processing of mined materials in which a valuable material such as a metal, mineral, coal, and the like, is separated, for example, extracted, from a mined material, that is, material which has been removed from the earth. Tailings typically comprise one or more of rock, clay, and sand. Tailings further comprise water. Water is used in combination with mechanical and/or chemical processes for removing the valuable material from the mined material. Mining operations include those for precious metals, base metals, ores, clays and coal. In addition, mining operations include recovery of bitumen from oil sands.

Tailings treatment and disposal are major issues for mining operations. Water recovery from the tailings for re-use in extraction processes and transportation is often desired. Tailings solids, such as rock, clay, sand, and other solid materials are generally sent to a storage facility or disposal area local to the mining operation. Management of such storage facilities or disposal areas is an enormous task.

Storage or disposal of tailings involves construction of a facility that is safe for storage (including permanent storage), sufficiently large and stable to contain the tailings within the facility, and protecting the local environment. It may be desirable to access water from the tailings storage facility for use in mining operations such as extracting and other treatments.

Various tailings streams are produced in extraction processes. A tailings stream is an aqueous stream (slurry, suspension) containing components requiring further treatment, which may include extraction of valuable material or solids removal and/or purification to enable recycle of the water content of the tailings stream. Some tailings streams will be deposited in a tailings pond for long periods of time, including permanently. Coarse solids may settle quickly. The top layer of the pond may clarify with time to make water that is suitable for re-use in the extraction process. A layer may comprise water and fine solids, which solids settle very slowly. This layer may ultimately become mature fine tailings (MFT).

MFT is a stable composite slurry comprising one or more of clay, sand, rock, and water. MFT has little strength, no vegetative potential and may be toxic to animal life, so it must be confined and prevented from contaminating water supplies. Typically, several years of settling time are required to make MFT, which may be stable with little additional settling or consolidation occurring for decades.

MFT ponds pose an environmental concern. For example, the Energy Resources Conservation Board of Alberta (ERCB) has issued Directive 074, which mandates a reduction of MFT ponds and the formation of trafficable deposits for MFT produced in mining and extraction of bitumen from oil sands by all oil sands operators.

Moffett disclosed, in US 2010/0104744 A1, a process to treat tailings streams with a silicate source and an activator. The silicate source is an alkali metal silicate, polysilicate microgel, or combinations thereof. The activator may be an acid, alkaline earth metal salt, aluminum salt, organic ester, dialdehyde, organic carbonate, organic phosphate, amide, or a combination thereof.

Alkali metal silicate solutions are distinct from colloidal silica sols by their ratio of silica to metal oxide ($SiO_2:M_2O$). For example, solutions of sodium silicate have $SiO_2:Na_2O$ of less than 4:1, as disclosed by Iler, "The Chemistry of Silica", Wiley Interscience (1979), page 116. Iler further recited that "silicate solutions of higher ratios were not available."

Moffett disclosed in U.S. patent application Ser. No. 13/329,375, filed Dec. 19, 2011, a process to treat tailings streams with a gelling agent and an activator. The gelling agent is selected from the group consisting of colloidal silica, aluminum-modified colloidal silica, de-ionized colloidal silica, polysiloxane, siliconate, acrylamide, acrylate, urethane, phenoplast, aminoplast, vinyl ester-styrene, polyester-styrene, furfuryl alcohol-based furol polymer, epoxy, vulcanized oil, lignin, lignosulfonate, lignosulfite, montan wax, polyvinyl pyrrolidone, and combinations of two or more thereof. The activator can be any compound or mixture of compounds that will initiate gelation.

An important aspect of tailings management is consolidation of the tailings solids—that is, to produce a dense material containing the solids in the tailings, for example to minimize storage space required upon disposal. According to Kotylar, et al., in Clay and Clay Minerals, Vol. 44, No. 1, pp. 121-131 (1996), in reference to oil sands fine tailings, sodium chloride is "the dominant contributor to the aggregation of nano-sized clay particles present in the tailings." Similarly, EP 1353876B1 claims silica sols with reduced quantity of salt has reduced agglomeration or aggregation.

While there have been many advances in the treatment of tailings, there remains a need to improve one or more of de-watering (less water in the tailings), consolidation (reduction of volume of the tailings), and strengthening of the tailings. There is also a need to reduce the amount of sodium added into the tailings stream to limit the sodium that may be introduced into the environment. There is also a need to return the mined area close to its original condition. The present invention meets these needs.

SUMMARY OF THE INVENTION

The present invention provides a process for treating a tailings stream wherein the tailings stream comprises water and solids, the process comprising (a) contacting a deionized silicate solution with a tailings stream whereby the solids are entrapped within a gel produced from the silicate solution; and (b) allowing the gel to strengthen and solidify. The solidified solids will typically have a minimum undrained shear strength (yield stress) of 5 kPa one year after deposition, and a minimum undrained shear strength of 10 kPa five years after deposition and can be used as a trafficable deposit.

A deionized silicate solution can be prepared by any known process: for example, by an electrolytic process and/or by use of an ion exchange resin. A deionized silicate solution, as used herein has a molar ratio of Si:M of at least 2.6, preferably at least 4, wherein M is an alkali metal, such as lithium, sodium, potassium, or combinations thereof. More preferably the molar ratio is 5 or greater.

In the step of allowing the gel to strengthen and solidify, the gel may be dewatered and/or dried.

Optionally, the process further comprises adding an accelerator, an activator, or combinations thereof in the contacting step (a). Optionally, the process further comprises adding a reinforcing agent in the contacting step (a). Optionally, the process further comprises adding an accelerator, an activator, a reinforcing agent, or combination thereof, in the contacting step (a). Optionally, the process further comprises depositing the gel produced in step (a) on and/or over a surface. The difference between "on" or "over" a surface may be a matter of degree, but is meant herein to indicate the gel is deposited on a surface in a particular location, whereas depositing over a surface involves spreading or flowing of the gel. There may be many instances of partial spreading or flow that is best described as a combination of depositing on a surface and depositing over a surface.

The tailings stream is preferably an aqueous stream produced after extraction or removal of a valuable mineral from a mining operation process stream. The present invention is particularly useful to treat tailings streams produced in processes to extract bitumen from oil sands ores.

In a second embodiment a trafficable deposit is produced from the treatment process. The trafficable deposit comprises the product of the treatment process, after dewatering and/or drying, optionally wherein the process comprises adding a reinforcing agent in the contacting step (a).

DETAILED DESCRIPTION OF THE INVENTION

The present invention is useful for treating tailings streams. A tailings stream is an aqueous stream comprising water, and one or more of clay, sand and rock. The tailings stream is produced as part of a mining or mineral processing operation for extraction or removal of a valuable mineral from mined materials. The tailings stream may comprise valuable mineral content (e.g., bitumen, coal, precious or base metal, gemstone) as part of the solids. Thus, there may be steps in advance of entrapping the solids (herein, step (a)) to remove the valuable mineral content. Essentially any mining or mineral processing operation that uses water to convey or wash materials will generate a tailings stream.

In a mining operation, there may be interest to recover and recycle the water content of the tailings stream. Alternatively, in an industrial mineral processing operation, water may be recycled to the processing operation such as milling, refining, smelting, and other manufacturing processes. Refining operations, for example, include extraction of oil, nickel or copper from the mined material.

The present invention is particularly useful for treatment of tailings stream produced from mining of oil sands ores. Oil sands ores are large deposits of naturally occurring mixtures comprising bitumen, sand, clays, and other inorganic materials, such as titanium or zirconium ores. Herein, bitumen refers to hydrocarbons and other oils found in oil sands, tar sands, crude oil and other petroleum sources. The oil sands ores typically comprise about 2 to 18 wt % bitumen, based on the total weight of the oil sands ore. Oil sand ores containing greater than 6 to 7 wt % bitumen, based on the total weight of the ore, are mined commercially today. The oil sands ores further comprise water, sand and clay. Generally the oil sands ores comprise about 2 to 5 wt % water.

Definitions

Certain terms as used herein have the definitions as provided below.

Clay is any naturally occurring material composed primarily of hydrous aluminum silicates. Clay may be a mixture of clay minerals and small amounts of nonclay materials or it may be predominantly one clay mineral. The type is determined by the predominant clay mineral.

The term coarse particle refers to a single particle or a collection of particles. It will be appreciated by those skilled in the art that that coarse particle size may vary depending on the source of the tailings stream. For example, in oil sands tailings coarse particles are defined as particles larger than 44 μm. Alternatively, in coal mine tailings, coarse particles are defined as particles larger than 2.5 μm.

Entrap solids means the solid particles, such as clay, sand, and rock, are trapped within the gel structure while the water is not permanently retained within the structure.

The term fine particle refers to a single particle or a collection of particles. It will be appreciated by those skilled in the art that that fine particle size may vary depending on the source of the tailings stream. For example, in oil sands tailings, fine particles are defined as particles smaller than 44 μm. Alternatively, in coal mine tailings, fine particles are defined as particles smaller than 2.5 μm.

Mineral is a naturally occurring inorganic element or compound having an orderly internal structure and characteristic chemical composition, crystal form, and physical properties.

Rock is any consolidated or coherent and relatively hard, naturally formed mass of mineral matter; stone, with the majority consisting of two or more minerals.

Sand is an unconsolidated or moderately consolidated sedimentary deposit; most commonly composed of quartz (silica), but may include particles of any mineral composition or mixture of rock or minerals, such as coral sand, which consists of limestone (calcium carbonate). (Source: AGI American Geosciences Institute)

Silt is a mixture of fine particulate rock and/or mineral.

Tailings stream is an aqueous fluid (slurry, suspension) comprising water and suspended solids. The suspended solids are not easily separated from the water. The tailings stream is produced from a mining operation or mineral processing plant. In a mining operation a material is removed from the earth. In a mineral processing plant, such material is treated to extract a valuable mineral such as coal, oil (such as from oil sands), precious metal ore, base metal ore, clay, gemstone. Mined materials include, for example, coal, uranium, potash, clay, phosphate, gypsum, precious metals and base metals.

Precious metals include gold, silver, platinum, palladium, ruthenium, rhodium, osmium, iridium. Gold, silver, platinum, and palladium are the most commonly mined precious metals. Base metals include nickel, copper, aluminum, lead, zinc, tin, tungsten, molybdenum, tantalum, cobalt, cadmium, titanium, zirconium, antimony, manganese, beryllium, chromium, germanium, vanadium, gallium, hafnium, indium, niobium, rhenium and thallium. Nickel, copper, aluminum, lead, and zinc are the most commonly mined base metals. Gemstones include diamond, emeralds (beryl), rubies, garnet, jade, opal, peridot, sapphire, topaz, turquoise, and others.

Other mining and mineral processing operations include oil sands mining and bitumen extraction and recovery processes.

The tailings stream may be a tailings pond, ore or ore mining process waters, chemically thickened tailings, MFT, or a combination thereof. Tailings streams useful in the present invention are described in U.S. patent application Ser. No. 13/329,375.

The tailings stream solids comprise one or more of clay, sand, and rock. Solids may further comprise silt. Solids may further comprise unextracted particles of mineral in the mined material. The solids have a particle size typically less than 0.5 mm, preferably less than 0.05 mm. The tailings typically comprise at least 5% solids by weight solids, preferably greater than 10% or greater than 20% solids, with the balance being water and/or dissolved materials such as salts and processing aids (organic solvent, extraction aids, and the like).

For a particular application, oil sands tailings streams may comprise solids wherein 5% to 100% by volume of the solids have a particle size of less than 0.5 mm, more preferably, 20% by volume to 100% by volume of the solids have a particle size less than 0.5 mm, based on the total volume of the solids. Oil sands tailings streams may comprise solids wherein 5% to 100% by volume of the solids have a particle size of less than 0.05 mm, typically, 10% by volume to 100% by volume of the solids have a particle size less than 0.05 mm, based on the total volume of the solids.

Tailings from mining and mineral processing operations have varied size distributions. Most tailings comprise a high percent of fine particles. For example, most tailings produced from mining and processing of copper, gold, iron, lead, zinc, molybdenum and taconite have 50% by weight or more of the particles passing a 0.075 mm (No. 200) sieve. Tailings from iron ore mining and mineral processing may have a slighter larger particle size. For properties of a number of tailings, see, for example http://www.rmrc.unh.edu/tools/uguidelines/mwst1.asp, accessed Jun. 21, 2012.

Trafficable deposit is a solid or semi-solid material that has been deposited on or over a surface. The trafficable deposit preferably has a minimum undrained shear strength of 5 kPa one year after deposition, and a minimum undrained shear strength of 10 kPa five years after deposition. A trafficable solid may be produced according to this invention by processes described hereinbelow.

Deionized Silicate Solution

The tailings stream is contacted with a deionized silicate solution. A deionized silicate solution may be prepared by deionizing a silicate solution.

A deionized silicate solution may be prepared by any means known in the art. Ion exchange methods are disclosed, for example, by Bird, in U.S. Pat. No. 2,244,325. The deionized silicate solution may be prepared by contacting a solution of alkali metal silicate with a strong cation exchange resin. The deionized silicate solution may alternatively be prepared by contacting a solution of alkali metal silicate with a weak ion exchange resin.

Iler, in U.S. Pat. No. 3,668,088, discloses a process to remove sodium anions from sodium silicate in an electrodialysis process wherein sodium silicate aqueous solution is electrolyzed while separated from an acid anolyte by a cation-permeable, anion-impermeable membrane.

A deionized silicate solution may be prepared by removing alkali metal from a solution of alkali metal silicate using bipolar electrolysis.

Other processes to prepare deionized silicate solutions include processes which rely on a combination of electrolysis and ion exchange membranes or ion-permeable membranes have been disclosed, for example, in JP20043236345A, JP2004323326A, JP07000803A, JP2002220220A, JP2003311130A and JP2002079527A.

More specifically, a sodium silicate (or water glass) solution may be contacted with a strong cation exchange resin. Strong cation exchange resins have sulfonic acid functionality, R—$SO_3H$, wherein R is the backbone of the resin or the matrix. The resin or matrix can be, for example, functionalized styrene divinylbenzene copolymers. Strong cation exchange resins are commercially available, for example, from Dow Chemical Company.

The deionized silicate solutions may be modified by alumina before, or during, or after the deionization process. Processes such as those disclosed in U.S. Pat. Nos. 5,482,693; 5,470,435; 5,543,014; and 5,626,721 can be used. Care must be taken when the process uses sodium aluminate so that the added sodium does not provide a Si:Na molar ratio less than 2.6 after such treatment.

The deionized silicate solution may be stabilized by methods known in the art, such as by control of pH or temperature.

A deionized silicate solution is an aqueous (water-based) solution. The solution has a molar ratio of Si:M of at least 2.6. M is an alkali metal, such as lithium, sodium, potassium, or combinations thereof. Preferably the molar ratio is 4 or greater, preferably 5 or greater. Higher ratios are also useful in the present invention, such as of at least 50 or greater, and at least 100 or greater. The upper limit of Si:M molar ratio may be set by practical considerations, for example capacity of an ion exchange resin for a given quantity of silicate solution, or alternatively, a minimum threshold for sodium in a particular tailings treatment system, in particular when recovered water is recycled for re-use.

The concentration of silica in the solution after deionization is 1-15% by weight, as "$SiO_2$", preferably 2-10%, more preferably 4-7%.

The deionized silicate solution may comprise particles, anions, and oligomers of silica. The silica specific surface area is greater than 500 $m^2/g$, typically greater than 750 $m^2/g$.

Accelerator

The process of this invention optionally uses an accelerator. Accelerators are useful to increase speed and decrease the time for the solids to become immobile. Accelerating agents are particularly useful for environments where temperatures are below 40° F. (4.4° C.). Examples of accelerators include multivalent metal compounds, acids, esters, and carbon dioxide. The multivalent metals may be calcium, magnesium, aluminum, iron, titanium, zirconium, cobalt or a combination of two or more thereof. Preferably, the multivalent metal compound is soluble in water and is used as an aqueous solution. Preferred multivalent metal compounds may be selected from the group consisting of calcium chloride, calcium sulfate, calcium hydroxide, aluminum sulfate, magnesium sulfate, and aluminum chloride, polyaluminum chloride, polyaluminum sulfate, and aluminum chlorohydrate. More preferably the multivalent metal compound is calcium sulfate, aluminum sulfate, polyaluminum sulfate, polyaluminum chloride, aluminum chlorohydrate, or combinations thereof. Acids include mineral acids, organic acids, sulfuric, hydrochloric, acetic acid, and glycolic acid. Salts of acids may be included. Esters include, for example, acetic esters of glycerol.

Use of salts to control pH must be limited so as to not result in a molar ratio of Si:M of less than 2.6. Use of acid, base, or carbon dioxide may depend on the pH of the tailings when combined with the deionized silicate solution. Preferably pH is between 4 and 8, with most rapid gelling to occur around pH 6.

Activator

The process of the invention optionally comprises an activator. Activators comprise any compound or mixture of compounds that will initiate gelation of the alkali metal silicates. Activators can include acids, alkaline earth metal and aluminum salts, and organic esters, dialdehydes, organic carbonates, organic phosphates, amides, carbon dioxide and combinations thereof. Examples of acids useful as activators include, but not limited to, sulfuric acid, phosphoric acid, sodium phosphate, sodium bicarbonate, hydrochloric acid, sodium hydrogen sulfate, and acetic acid. Examples of alkaline earth metal and aluminum salts include, but not limited to, calcium chloride, calcium oxide, calcium carbonate, calcium sulfate, magnesium sulfate, magnesium chloride, aluminum sulfate, sodium aluminate. Examples of organic esters, dialdehydes, organic carbonates, organic phosphates, and amides include, but not limited to, acetic esters of glycerol, glyoxal, ethylene carbonate, propylene carbonate, and formamide. Preferably, the activator is an acid, an alkaline earth metal salt, carbon dioxide or combinations thereof. Preferred acids are sulfuric acid. Preferred alkaline earth metal salts are calcium sulfate and calcium chloride. One or more activators may be used.

Reinforcing Agent

The process of the invention optionally comprises a reinforcing agent. Reinforcing agents are compounds that act as fillers and mechanically strengthen the treated tailings stream. Reinforcing agents can be used in an amount up to about 70 weight percent of the total weight of the trafficable deposit.

Reinforcing agents are selected from the group consisting of fine gravel, sand from mining operations, waste rock from mining operations; petroleum coke, coal particles; elemental crystalline sulfur; inorganic fibers; organic fibers, and combinations of two or more thereof. Particle size definitions for gravel are determined by ASTM D2488 (2009) "Standard Practice for Description and Identification of Soils (Visual-Manual Procedure)," DOI: 10.1520/D2488-09A, available from ASTM International, West Conshohocken, Pa. Inorganic fibers can be, for example, steel fibers or fiberglass. Organic fibers can be, for example, pulp waste, paper waste, wood waste, and waste paper.

In addition, the surface of the reinforcing agent may be untreated or the surface may have been treated with a surface-active agent. A typical surface-active agent is an organic silane. Surface-active agents strengthen interfacial bonds between the reinforcing agent and the treated tailings.

Trafficable Deposit

In a second embodiment a trafficable deposit is produced by a process according to this invention. The trafficable deposit comprises the product of the treatment process, after full or partial dewatering and/or drying, optionally wherein the process comprises adding a reinforcing agent in the contacting step (a). The trafficable deposit preferably has a minimum undrained shear strength (yield stress) of 5 kPa one year after deposition, and a minimum undrained shear strength of 10 kPa five years after deposition.

Treatment of Tailings Stream

This invention provides a process for treating a tailings stream comprising (a) contacting a deionized silicate solution with a tailings stream whereby the solids are entrapped within a gel produced from the silicate solution; and (b) allowing the gel to strengthen and solidify. It is noted herein that in contrast to flocculation, in which suspended particles coalesce to form a precipitate, in the process of this invention, upon contact with the deionized silicate solution, the tailings stream becomes viscous, and then develops rigidity as it strengthens and solidifies.

By "strengthen and solidify", it is meant herein that the gel has formed a solid mass, which separates from the water present in the tailings stream. The solid mass will typically have developed a minimum undrained shear strength of 5 kPa one year after deposition, and a minimum undrained shear strength of 10 kPa five years after deposition. Strengthen and solidify may include a dewatering step and/or a drying step. The product from step (b) may have sufficient strength as a trafficable deposit.

As used herein, separation of water includes partial separation of water from the gel. Separation may occur or be performed by means such as evaporation, drainage, mechanical dewatering, run-off, compression, exudation, percolation of water to underlying surface, freeze/thaw, sublimation, syneresis. It should be understood that the gel may retain a portion of the total amount of water from the tailings stream as all traces would be nearly impossible to remove and water from natural precipitation or run-off from higher elevation of material may become part of the gel.

By "run-off" it is meant that water is exuded from the gel-entrapped solids, or alternatively water from natural precipitation (rain, snow) that passes over the gel-entrapped solids and runs off the tailings. Run-off is generally captured in a water collection area (e.g., a pond). If water run-off occurs, one may recover the water from this process and recycle the run off water. For compression, the solids can be deposited into a dewatering pit, where one or more sides allow water run-off to be recovered. For example, the water run-off or recovered water can be re-used in either bitumen extraction or other processes. Advantageously, use of deionized silicate solution provides lower alkali metal ion concentration in the recovered water.

The gel comprising entrapped solids may undergo "forced drying" using plate-and-frame filter press, or other mechanical dewatering means. Following a forced drying step the dried product may then be spread on a surface, preferably a sloped surface or deposited in a dewatering pit.

Optionally, the process further comprises adding an accelerator in the contacting step (a). Optionally the process further comprises adding a reinforcing agent in the contacting step (a). Optionally, the process further comprises spreading the gel produced in step (a) over a surface. Preferably, the surface is sloped or in a dewatering pit.

In a second embodiment a trafficable deposit is produced from the process to treat tailings streams. The trafficable deposit comprises the product of the treatment process, after dewatering and/or drying, optionally comprising adding a reinforcing agent in the contacting step (a). The trafficable deposit preferably has a minimum undrained shear strength of 5 kPa one year after deposition, and a minimum undrained shear strength of 10 kPa five years after deposition.

Each of deionized silicate solution, optional accelerator and optional reinforcing agent are described above. Each of these is used in an effective amount to produce a gel, entrapping solids, such as sand, clay, and other solids in the stream, and to provide a trafficable deposit after strengthening, dewatering and drying. Thus, the solids from the tailings stream are entrapped within the gel.

The tailings stream can be any tailings stream such as, for example, those described hereinabove. A preferred tailings stream is produced in a bitumen extraction process. The tailings stream may be or comprise mature fine tailings.

The deionized silicate solution is added to the tailings stream in an amount equal to 0.01 to 20 kilograms ("kg"), on an $SiO_2$ basis per metric tonne ("tonne") (kg/tonne) based on the total weight of the tailings stream. Preferably the deionized silicate solution is added in an amount equal to 0.1 to 10 kg on a $SiO_2$ basis per metric tonne based on the total weight of the tailings stream.

When used, an accelerator is added in an amount equal to 0.01 to 5% by weight, based on the total weight of the tailings stream.

When used, a reinforcing agent is added in an amount equal to 0.1 to 700 kg/tonne based on the total weight of the tailings stream. Preferably the reinforcing agent is added in an amount equal to 0.1 to 100 kg/tonne based on the total weight of the tailings stream. More preferably the reinforcing agent is added in an amount equal to 0.1 to 10 kg/tonne based on the total weight of the tailings stream.

The contacting step (a) can be performed in various ways. The tailings stream and deionized silicate solution with optional accelerator and/or reinforcing agent may be contacted in a vessel and deposited on a surface and allowed to dry. The tailings stream, deionized silicate solution and optional accelerator and/or reinforcing agent may be contacted and centrifuged to enhance separation with a reduced amount of deionized silicate solution needed. Preferably, the deionized silicate solution and optional accelerator and/or reinforcing agent are contacted with the tailings stream in a transfer line to initiate gelation, whereas gel matrix formation occurs outside the line to avoid plugging of the line. The gel matrix is spread on a surface and allowed to de-water and dry. The deionized silicate solution may be added directly to a tailings pond. When added to a tailings pond, water is allowed to evaporate or is separated by other means to dewater the tailings. Separation of water may occur or be performed by the means cited above, including mechanical dewatering, run-off, freeze-thaw, etc.

The process for treating a tailings stream comprising contacting a deionized silicate solution with a tailings stream may be adjusted to vary gelation times. As used herein, gelation means the rapid increase in viscosity and yield strength. Adjustments include, but not limited to, varying the order of addition and/or concentration of the deionized silicate solution, accelerators, and/or reinforcing agents. Gelation time can be varied by making adjustments to pH (adding acid to lower pH, adding base to raise pH).

The concentration of the deionized silicate solution will allow for adequate handling prior to formation into an immobile solid. This is important, for example, for applications where the tailings stream will be contacted with the deionized silicate solution and optional accelerator(s) and/or reinforcing agents in pipes then pumped to the desired area, where the combination will be discharged onto a surface for gelling.

The gel matrix comprising the tailings stream and deionized silicate solution may be deposited such as by pumping or spraying, on a surface. Gel time may be controlled by means such as addition or lack of accelerators, concentrations, residence time, pH, temperature. As will be appreciated by those skilled in the art, it is important to pump, spray or transfer the gel in a time before the gel solidifies to avoid forming a solid that may plug a pump, a spray nozzle or transfer line. Also, spraying the combination of tailings stream and deionized silicate solution onto a slope, before the gelation process is initiated is also a problem as the "unjelled" mixture may run off the slope and not set in the desired location.

The tailings stream comprises water and solids. Contacting the tailings stream with deionized silicate solution and optional accelerator and/or reinforcing agent produces a gel matrix, which entraps the solids. The accelerator, reinforcing agents, or combinations thereof, may be a) premixed with the deionized silicate solution prior to contacting with the tailings streams, b) added simultaneously with the deionized silicate solution while the deionized silicate solution is contacting the tailings stream, or c) added sequentially following contacting the deionized silicate solution with the tailings stream provided that it is prior to producing a gel matrix.

The gel matrix is then allowed to strengthen and solidify, e.g., with dewatering and/or drying to produce a trafficable deposit which is a hard solid. Upon strengthening, dewatering and/or drying, the sand, clay and other solids entrapped within the gel matrix become a hard solid that is a trafficable deposit.

Gel-entrapped solids formed from this process may be deposited on a surface, preferably a sloped surface, and allowed to solidify. This step of applying the product of the contacting step to a surface may be repeated numerous times, producing a lift of several layers of solid surface that encompass the solids including the fines of the tailings stream.

Gel-entrapped solids formed from this process may be deposited into a dewatering pit in one or more layers. When deposited in more than one layer, the weight of multiple layers produces a compression effect which then presses out water of the multiple layer deposit. Sand or porous media may be inserted beneath a layer to enhance dewatering and drying.

EXAMPLES

Materials and Test Methods

Mature fine tailings used in the following examples were obtained from an oil sands processor in Alberta, Canada. Unless otherwise noted, the solids concentrations were 25.0% to 30% on a weight basis and the mature fine tailings were determined to have >90 volume % particle size smaller than 0.05 mm and a peak yield stress <10 Pa.

Yield stress measurements of the samples were obtained by using a Brookfield rheometer equipped with a vane spindle using Brookfield Rheocalc software and results are reported in Pa (pascals). Yield stress is a measurement defined as the minimum stress needed to cause a Bingham plastic to flow. A higher yield stress indicates greater resistance to flow.

Example 1

This Example illustrates the preparation of a deionized silicate solution.
Preparation of Deionized Silicate Solution.

A deionized silicate solution was prepared by adding acid ion exchange resin (DOWEX HCR-W2 H+ resin, commercially available from Dow Chemical Company, Midland, Mich.), to a 4 wt % $SiO_2$ solution prepared by mixing 14.08 grams of 41° Be sodium silicate solution having a 3.22 weight ratio of $SiO_2:Na_2O$ (1.7 molar ratio of Si:Na, available from VWR) with 85.92 grams of deionized water. A total of 2 grams of Dowex resin was added to the solution for every one gram of sodium silicate solution. The Dowex resin was removed by filtration from the dilute deionized silicate solution when the pH reached 3.0.

The resulting silicate solution was analyzed by ICP and found to have a Si:Na molar ratio of 700:1.

Example 2

This example illustrates rheological modification of MFT with deionized sodium silicate without the need for the addition of an activator.

A deionized silicate solution was prepared following the procedure described in Example 1. To avoid microgel formation, the silicate solution was used within 60 minutes after preparation. The deionized silicate solution (68.4 g) was added to 750 g of MFT having a solids content of 40 wt % and pH of 7.6.

The yield stress of the untreated MFT was determined to be approximately 27 Pa. The yield stress of the treated MFT was determined to be 619 Pa after 24 hours.

Example 3

This example illustrates how the addition of deionized silicate solution does not cause an increase in sodium content of the exuded water from treated tailings.

A deionized silicate solution was prepared following the procedure described in Example 1. To avoid microgel formation, the silicate solution was used within 30 minutes after preparation. The deionized silicate solution (22.8 g) was added to 250 g of MFT having a solids content of 27 wt % and untreated pH of 8.2. The pH of the treated MFT was adjusted to 7.6 with sodium hydroxide solution after the addition of the deionized silica solution.

Yield stress was measured 3 days after treatment and determined to be 211 Pa. Exuded water from the treated MFT was filtered through a 0.45 micron syringe filter and analyzed by ICP. The water from the treated sample was found to contain 855 ppm sodium ions. The water from the untreated MFT was found to contain 860 ppm sodium.

Examples 4 to 7

Examples 4 to 7 illustrate the use of a deionized silicate solution for treating a tailings stream at varying range of pH.

A deionized silicate solution was prepared following the procedure described in Example 1. The deionized solution was not aged before use in Examples 4 to 7. A portion of the deionized silicate solution was added to each of four beakers (43.5 g to each beaker) along with mature fine tailings (500 g, 30% by weight solids). The contents of the four beakers were stirred to provide a mixture. Sulfuric acid (2.5 N) was added to each mixture to adjust pH to provide individual mixtures of pH 4, 5, 6, and 7.

After 24 hours, the yield stress of each mixture was measured. Results are provided in Table 1.

TABLE 1

Examples 4 to 7 yield stress results at varying pH.

| Example | pH | Yield Stress @ 24 hours (Pa) |
|---|---|---|
| 4 | 7 | 335 |
| 5 | 6 | 376 |
| 6 | 5 | 439 |
| 7 | 4 | 452 |

As can be seen from the results in Table 1, use of a deionized silicate solution functions over a range of pH.

Comparative Examples A to C

A sample of deionized colloidal silica, Ludox® SM, available from W. R. Grace & Company, Columbia, Md., containing 15 wt % $SiO_2$ was used. The molar ratio of Si:Na was 29:1. An amount of the colloidal silica (23.3 g) was added to each of three beakers along with mature fine tailings (500 g, 25% by weight solids). The contents of the three beakers were stirred to provide a mixture. Sulfuric acid (2.5 N) was added to each mixture to adjust pH to provide individual mixtures of pH 5, 6, and 7.

After 24 hours, the yield stress of each mixture was measured. Results are provided in Table 2.

TABLE 2

Comparative Examples 8 to 10 yield stress results at varying pH.

| Comparative Example | pH | Yield Stress @ 24 hours (Pa) |
|---|---|---|
| A | 5 | 20 |
| B | 6 | 13 |
| C | 7 | 11 |

As can be seen from the results in Table 2, use of a deionized colloidal silica does not provide equivalent rheology modification to that achieved when using deionized silicate solution as illustrated above in Table 1.

In can be appreciated by one skilled in the art, based on drying trends of the deposits of the present invention, in combination with knowledge of the correlation of solids concentrations of treated tailings and shear stress, that tailings streams treated by a process of the present invention will obtain the desired minimum undrained shear strength of 5 kPa one year after deposition, and a minimum undrained shear strength of 10 kPa five years after deposition.

What is claimed is:

1. A process for treating a tailings stream without use of an activator comprising (a) contacting a deionized silicate solution having a molar ratio of Si:M of at least 2.6, wherein M is an alkali metal, with a tailings stream comprising water and solids whereby the solids are entrapped within a gel produced from the silicate solution; and (b) allowing the gel to strengthen and solidify.

2. A process according to claim 1 wherein the deionized silicate solution is prepared by contacting a solution of sodium silicate with a strong cation exchange resin.

3. A process according to claim 1 wherein the deionized silicate solution is prepared by contacting a solution of sodium silicate with a weak cation exchange resin.

4. A process according to claim 1 wherein the deionized silicate solution is prepared by removing alkali metal from a solution of alkali metal silicate using bipolar electrolysis.

5. A process according to claim 1 further comprising adding a reinforcing agent in the contacting step (a).

6. A process according to claim 5 further comprising spreading the gel produced in step (a) over a surface.

7. A process according to claim 6 wherein the surface is a sloped surface.

8. A process according to claim 1 further comprising depositing the gel produced in step (a) in a dewatering pit.

9. A process according to claim 1 wherein the tailings stream is produced in a process to extract bitumen from oil sands ores.

10. A process according to claim 1 wherein step (b) comprises a dewatering step.

11. A process according to claim 10 wherein dewatering occurs by air drying (evaporation), water runoff, compression, syneresis, exudation, freeze/thaw, sublimation or combination thereof.

12. A process according to claim 11 wherein the water runs off is recovered and recycled.

13. A process according to claim 5 wherein the reinforcing agent is selected from the group consisting of gravel, sand from mining operations, waste rock from mining operations; petroleum coke, coal particles; elemental crystalline sulfur; inorganic fibers; organic fibers, and combinations of two or more thereof.

14. A process according to claim 1 wherein the deionized silicate solution is added in an amount equal to 0.01 to 20 kg on a $SiO_2$ basis per metric tonne of solids in the tailings stream.

15. A process according to claim 5 wherein the reinforcing agent is added in an amount equal to 0.01 to 700 kg/tonne of solids in the tailings stream.

16. A process for treating a tailings stream comprising (a) contacting a deionized silicate solution having a molar ratio of Si:M of at least 2.6, wherein M is an alkali metal, with a tailings stream comprising water and solids whereby the solids are entrapped within a gel produced from the silicate solution; and (b) allowing the gel to strengthen and solidify; wherein the process is completed without use of an activator.

17. The process according to claim 16 wherein the deionized silicate solution is prepared by contacting a solution of sodium silicate with a strong cation exchange resin.

18. The process according to claim 16 wherein the deionized silicate solution is prepared by contacting a solution of sodium silicate with a weak cation exchange resin.

19. The process according to claim 16 further comprising adding a reinforcing agent in the contacting step (a).

20. The process according to claim 16 wherein the tailings stream is produced in a process to extract bitumen from oil sands ores.

* * * * *